(12) United States Patent
Muthukumar et al.

(10) Patent No.: US 12,394,173 B2
(45) Date of Patent: Aug. 19, 2025

(54) FACILITATING ANNOTATION OF OBJECTS

(71) Applicant: Telefonaktiebolaget LM Ericsson (publ), Stockholm (SE)

(72) Inventors: Thalanayar Muthukumar, Plano, TX (US); Volodya Grancharov, Solna (SE); Marc Couch, Frisco, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 351 days.

(21) Appl. No.: 17/917,332

(22) PCT Filed: Apr. 6, 2020

(86) PCT No.: PCT/EP2020/059772
§ 371 (c)(1),
(2) Date: Oct. 6, 2022

(87) PCT Pub. No.: WO2021/204350
PCT Pub. Date: Oct. 14, 2021

(65) Prior Publication Data
US 2023/0154136 A1 May 18, 2023

(51) Int. Cl.
*G06V 10/20* (2022.01)
*G06V 10/26* (2022.01)
(Continued)

(52) U.S. Cl.
CPC .......... *G06V 10/255* (2022.01); *G06V 10/273* (2022.01); *G06V 10/44* (2022.01); *G06V 10/56* (2022.01); *G06V 20/70* (2022.01)

(58) Field of Classification Search
CPC .... G06V 10/255; G06V 10/273; G06V 10/44; G06V 10/56; G06V 20/70
See application file for complete search history.

(56) References Cited

U.S. PATENT DOCUMENTS 6,674,925 B1 * 1/2004 Schoepflin .............. G06T 7/251
348/169
2016/0140392 A1 5/2016 Gurbuz
(Continued)

OTHER PUBLICATIONS

"Francesco G. B. De Natale et. al., Detecting Morphological Filtering of Binary Images, Jan. 2017, IEEE Transactions on Information Forensics and Security, vol. 12, Issue 5" (Year: 2017).*
(Continued)

*Primary Examiner* — Chineyere Wills-Burns
*Assistant Examiner* — Phuong Hau Cai
(74) *Attorney, Agent, or Firm* — Rothwell, Figg, Ernst & Manbeck, P.C.

(57) ABSTRACT

The present disclosure relates to a method of facilitating annotation of an object (201) in a sequence of images, and a device (109) performing the method. In a first aspect a method of facilitating annotation of an object (201) in a sequence of images is provided. The method comprises marking (S101) the object (201) in an image in the sequence of images, performing (S102) edge detection on the marked object (201) in the sequence of images, suppressing (S103) visual data (203, 204) other than the object (201) being subjected to edge detection in the sequence of images, and adjusting (S104) position of a marking (202) such that the marking is aligned with the object (201) being subjected to edge detection in subsequent images of the sequence.

8 Claims, 6 Drawing Sheets

(51) Int. Cl.
*G06V 10/44* (2022.01)
*G06V 10/56* (2022.01)
*G06V 20/70* (2022.01)

(56) References Cited

U.S. PATENT DOCUMENTS

2018/0268237 A1  9/2018  Stanimirovic et al.
2019/0005652 A1  1/2019  Pham

OTHER PUBLICATIONS

"Soumya Dutta et. al., A Color Edge Detection Algorithm in RGB Color Space, Oct. 2009, 2009 International Conference on Advances in Recent Technologies in Communication and Computing, Kottayam, India" (Year: 2009).*

"P. Ganesan et. al., Assessment of satellite image segmentation in RGB and HSV color space using image quality measures, Jan. 2014, 2014 International Conference on Advances in Electrical Engineering, Vellore, India" (Year: 2014).*

"Kiru Park et. al., Multi-Task Template Matching for Object Detection, Segmentation and Pose Estimation Using Depth Images, May 2019, 2019 International Conference on Robotics and Automation, Montreal, Canada" (Year: 2019).*

"Martin Runz et. al., MaskFusion: Real-Time Recognition, Tracking and Reconstruction of Multiple Moving Objects, Oct. 2018, 2018 IEEE International Symposium on Mixed and Augmented Reality, Munch Germany" (Year: 2018).*

"Michael Schmeing et. al., Edge-Aware Depth Image Filtering Using Color Segmentation, Dec. 2014, Pattern Recognition Letters, vol. 50, pp. 63-71" (Year: 2014).*

"Frank Y. Shih et. al., Adaptive Mathematical Morphology for Edge Linking, Dec. 2004, Information Sciences, vol. 167, Issue 1-4, p. 9-21" (Year: 2004).*

International Search Report and Written Opinion dated Dec. 8, 2020 in International Application No. PCT/EP2020/059772 (10 pages).

Ren, S. et al., "Faster R-CNN: Towards Real-Time Object Detection with Region Proposal Networks", Jan. 6, 2016, arXiv:1506.01497v3 [cs.CV] (14 pages).

Liu, W. et al., "SSD: Single Shot MultiBox Detector", Dec. 29, 2016, arXiv:1512.02325v5 [cs.CV] (17 pages).

Redmon, J. et al., "YOLO9000: Better, Faster, Stronger", Dec. 25, 2016, arXiv:1612.08242v1 [cs.CV], http://pjreddie.com/yolo9000/ (9 pages).

GitHub, "tzutalin / labellmg: Labellmg is a graphical image annotation tool and label object bounding boxes in images", Aug. 3, 2020, https://github.com/tzutalin/labellmg (8 pages).

GitHub, "microsoft/VoTT: Visual Object Tagging Tool: An electron app for building end to end Object Detection Models from Images and Videos", Aug. 3, 2020, https://github.com/microsoft/VoTT (15 pages).

GitHub, "Ericsson/eva: EVA is a web-based tool for efficient annotation of videos and image sequences and has an additional tracking capabilities", Aug. 3, 2020, https://github.com/Ericsson/eva (4 pages).

Henriques, J.F. et al., "High-Speed Tracking with Kernelized Correlation Filters", IEEE Transactions on Pattern Analysis and Machine Intelligence, Nov. 5, 2014, arXiv:1404.7584v3 [cs.CV] (14 pages).

Kalal, Z. et al., "Tracking-Learning-Detection", IEEE Transactions on Pattern Analysis and Machine Intelligence, vol. 6, No. 1, Jan. 2010 (14 pages).

Possegger, H. et al., "In Defense of Color-based Model-free Tracking", Computer Vision Foundation, 2015 (1 page).

Shen, A., "BeaverDam: Video Annotation Tool for Computer Vision Training Labels", Dec. 8, 2016, Electrical Engineering and Computer Sciences, University of California at Berkeley, Technical Report No. UCB/EECS-2016-193, http://www2.eecs.berkeley.edu/Pubs/TechRpts/2016/EECS-2016-193.html (27 pages).

GitHub, "antingshen/BeaverDam: Video annotation tool for deep learning training labels", Aug. 3, 2020, https://github.com/antingshen/BeaverDam (4 pages).

Vondrick, C. et al., "Efficiently Scaling Up Crowdsourced Video Annotation: A Set of Best Practices for High Quality, Economical Video Labeling", International Journal of Computer Vision manuscript No., Received: Oct. 31, 2011 / Accepted: Jun. 12, 2012 (22 pages).

GitHub, "wkentaro/labelme: Image Polygonal Annotation with Python (polygon, rectangle, circle, line, point and image-level flag annotation)", Aug. 3, 2020, https://github.com/wkentaro/labelme (7 pages).

Dutta, A. et al., "VGG Image Annotator (VIA)", Visual Geometry Group—University of Oxford, Aug. 3, 2020, www.robots.ox.ac.uk/~vgg/software/via/ (5 pages).

Supervisely, "Web platform for computer vision. Annotation, training and deploy: The leading platform for entire computer vision lifecycle", Aug. 3, 2020, https://supervise.ly (6 pages).

* cited by examiner

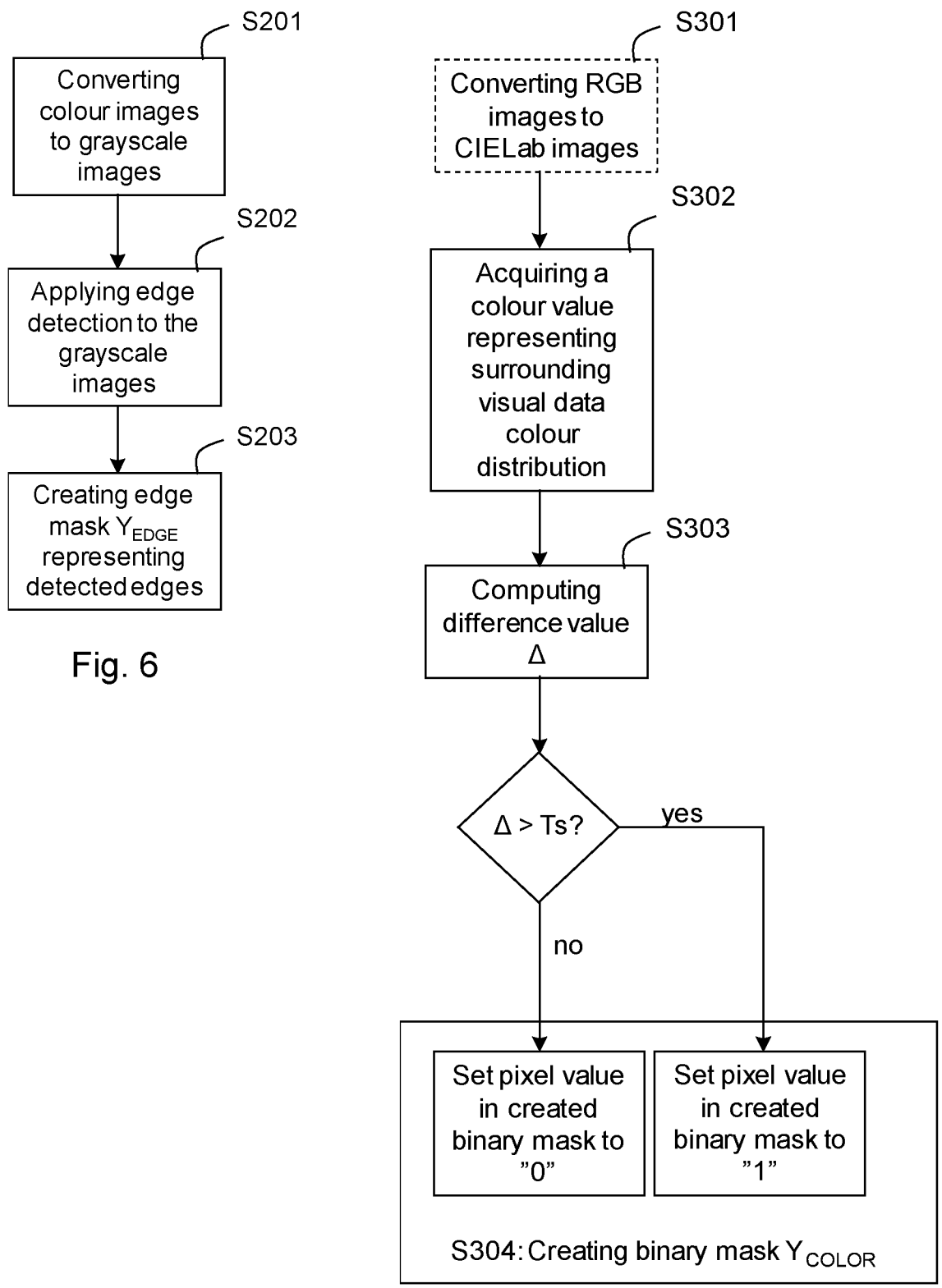

FACILITATING ANNOTATION OF OBJECTS

CROSS REFERENCE TO RELATED APPLICATIONS

This application is a 35 U.S.C. § 371 National Stage of International Patent Application No. PCT/EP2020/059772, filed Apr. 6, 2020.

TECHNICAL FIELD

The present disclosure relates to a method of facilitating annotation of an object in a sequence of images, and a device performing the method.

BACKGROUND

The emergence of CNN (Convolutional Neural Network) based visual object detectors has caused a rapid acceleration in the field of visual classification and detection. Despite of recent advances, size and contents of existing training datasets is one of the main limiting factors for the future development and scaling-up of these algorithms using CNN based detectors require large amounts of labelled training data to continue improving their accuracy. The need for more training data seems to be constantly growing. This trend puts significant pressure on the image and video annotation tools, needed to generate such enormous datasets.

A first step for the research community was to focus on simple platforms for labelling of static images. Next, more advanced system with integrated trackers started to emerge. Prior art video annotation tools can integrate any conventional trackers to follow a so-called bounding box (BB) manually drawn in an initial frame around an object of interest. This shortens the time of annotation in respect to manual concepts, where objects of interests are manually marked in every single frame. Despite of all efforts, image/video annotation is still expensive and time-consuming, which prevents mass deployment of visual object detectors.

SUMMARY

One objective is to solve, or at least mitigate, this problem in the art and thus to provide an improved method of facilitating annotation of an object in a sequence of images This objective is attained in a first aspect by a method of facilitating annotation of an object in a sequence of images. The method comprises marking the object in an image in the sequence of images, performing edge detection on the marked object in the sequence of images, suppressing visual data other than the object being subjected to edge detection in the sequence of images, and adjusting position of a marking such that the marking is aligned with the object being subjected to edge detection in subsequent images of the sequence.

This objective is attained in a second aspect by a device configured to facilitate annotation of an object in a sequence of images. The device comprises a processing unit and a memory, said memory containing instructions executable by said processing unit, whereby the device is operative to mark the object in an image in the sequence of images, perform edge detection on the marked object in the sequence of images, suppress visual data other than the object being subjected to edge detection in the sequence of images, and adjust position of a marking such that the marking is aligned with the object being subjected to edge detection in subsequent images of the sequence.

Thus, a system operator may manually place a marking around an object to be subjected to edge detection in a first of a number of images in a sequence, or a tracking algorithm may automatically place a marking around the object.

Thereafter, edge detection is performed on the marked object in order to visually enhance the object with respect to surrounding visual data in the image, which for instance may be embodied by items such as people, vehicles, forest, grassland, etc.

Further, the surrounding visual data in the image is suppressed, thereby causing the marked object to be even further visually enhanced with respect to its surroundings. Hence, not only has edge segmentation been performed but also colour segmentation.

Advantageously, the marked object is been heavily segmented with respect to its surroundings, and the ability of the tracking algorithm of moving a possibly drifting marking (for instance in the form of a BB) in the sequence of images to a position where it is aligned with the object in one or more subsequent images of the sequence is greatly improved since the marked object becomes clearly distinguishable from its surroundings after edge and colour segmentation has been applied to the sequence of images.

It is noted that even if a system operator manually would have to adjust the position of the marking in one or more images in the sequence, visual inspection of the accuracy of the alignment of the marking with the edges of the object is greatly facilitated in the edge- and colour-segmented image as compared to the original image.

This advantageously reduces cost of visual data annotation and allows image and video analytics infrastructure to be built faster and cheaper; creating of training data creation is currently the limitation factor for these applications.

In an embodiment, the performing of the edge detection comprises representing edges of the object in the sequence of images with a first pixel value; the suppressing of the visual data other than the object being subjected to edge detection in the sequence of images comprising representing the suppressed visual data in the sequence of images with a second pixel value.

In an embodiment, the marking of the object in the image in the sequence of images comprises tracing contours of the object in the sequence of images.

In an embodiment, the performing of the edge detection comprises converting colour images in the sequence to grayscale images, applying edge detection on the grayscale images to obtain binary images, and creating a mask for each image in the sequence representing the detected edges of the object by applying morphological dilation to the binary images.

In an embodiment, the suppressing of visual data comprises performing colour segmentation in the sequence of images.

In an embodiment, the performing of the colour segmentation comprises acquiring a colour value representing a colour distribution of the visual data to be suppressed from the sequence of images, computing a difference value indicating difference between colour values of the visual data to be suppressed in each image in the sequence and the acquired colour value representing the colour distribution, and creating binary mask for each image in the sequence where a binary mask pixel attains a first value if a corresponding computed difference value exceeds a suppression threshold value and a second value if the corresponding computed difference value is equal to or below the suppression threshold value.

In an embodiment, the acquired colour value representing the colour distribution of the visual data to be suppressed is the average colour value of the visual data to be suppressed.

In an embodiment, the method further comprises converting colour images in the sequence to a colour space less sensitive to illumination variations before acquiring a colour value representing the colour distribution of the visual data to be suppressed from the sequence of images, wherein the colour value representing the colour distribution is acquired from one or more of the converted images, and the computed difference value indicating the difference in the converted images between the colour values of the visual data to be suppressed in each image in the sequence and the colour value representing the colour distribution is acquired from one or more of the converted images.

In an embodiment, the acquiring of the colour value representing the colour distribution of the visual data to be suppressed being acquired from one or more previous images in the sequence, or from a current image in the sequence.

In an embodiment, the performing of the edge detection further comprises masking each image in the sequence with the corresponding created mask representing the detected edges of the object.

In an embodiment, the performing of the edge detection and the colour segmenting further comprises acquiring the colour value representing the colour distribution of the object being subjected to edge detection for each image in the sequence, and if a difference between the colour value of the object and the colour value of the visual data to be suppressed exceeds an object distinction threshold value each image in the sequence is masked with a corresponding mask being a combination of the created mask representing the detected edges of the object and the binary mask for each image.

In an embodiment, the adjusting of the position of the marking comprises adjusting the position of the marking of the object being subjected to edge detection of a masked image in the sequence with respect to a previous image in the sequence, wherein the marking is considered to be aligned with the object being subjected to edge detection when a number of overlapping pixels between the marking and the object exceeds an overlap threshold value or when a maximum number of overlapping pixels is acquired.

In an embodiment, the adjusting of the position of the marking comprises adjusting the position of the marking of the object being subjected to edge detection of a masked image in the sequence with respect to a previous image in the sequence, wherein the marking is considered to be aligned with the object being subjected to edge detection when the marking is placed at a position where a maximum overlap in pixels occur between the object being subjected to edge detection in a previous image and the object being subjected to edge detection in the current image.

In an embodiment, depth information is associated with each image in the sequence, and the method further comprises evaluating the depth information to segment the object subjected to edge detection in each image of the sequence from the visual data to be suppressed.

In a third aspect, a computer program is provided comprising computer-executable instructions for causing a device to perform the method of the first aspect when the computer-executable instructions are executed on a processing unit included in the device.

In a fourth aspect, a computer program product is provided comprising a computer readable medium, the computer readable medium having the computer program according to the third aspect embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIG. 6 illustrates a flowchart of a method of facilitating annotation of an object in a sequence of images according to a further embodiment;

FIG. 7 illustrates a flowchart of a method of facilitating annotation of an object in a sequence of images according to yet a further embodiment;

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

As previously discussed, even advanced image/video annotation tools have problems in tracking objects in a sequence of images. First, the tracking algorithms are far from perfect, which requires frequent adjustment of the bounding boxes (BB) being placed around an object to be tracked in the image sequence. Second, the person using the annotation tool quickly becomes weary of the tedious process of accurately adjusting BBs to be aligned with the edges of the object.

Figures 1A, 1B:
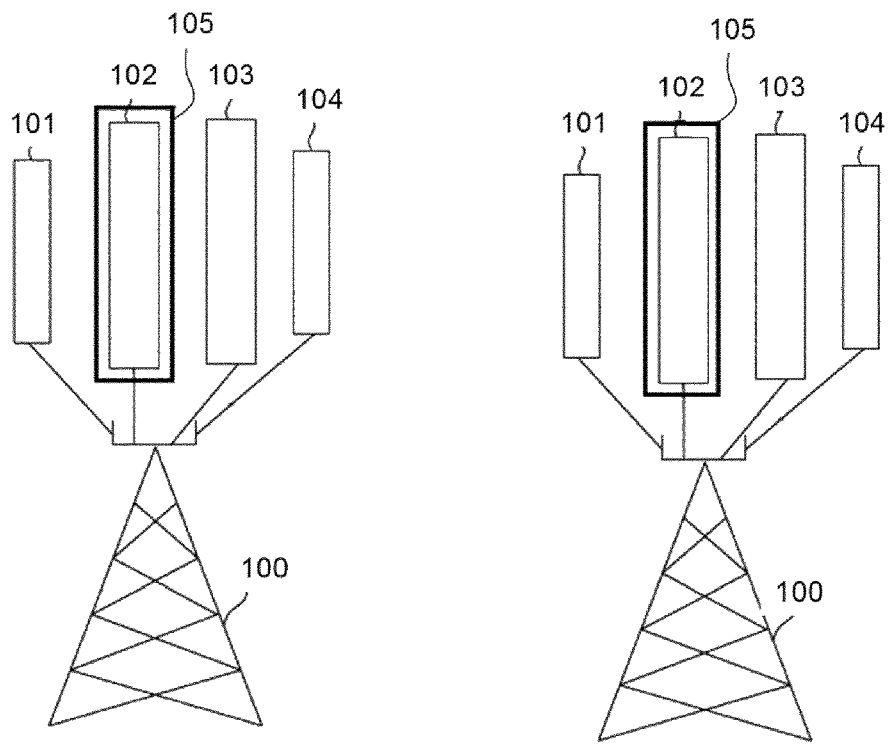
FIGS. 1a and b illustrate bounding box drift for a sequence of images.

FIGS. 1a and 1b illustrate such BB drift occurring for a sequence of images depicting telecommunication equipment in the form of a cell tower 100 comprising a plurality of antennae 101, 102, 103, 104. It should be noted that objects to be annotated, i.e. objects for which a marking such as a BB is provided in the images for tracking the object throughout the sequence, may constitute any type of object, such as individuals or vehicles in a video captured by a surveillance camera, animals to be studied on a footage sequence, articles in a manufacturing plant, etc. In the exemplifying embodiments in the below, the object is embodied by means of telecommunication equipment.

As shown in FIG. 1a, a third antenna 103 is marked with a BB 105 in an image. FIG. 1b illustrates a subsequent image in the sequence where the BB 105 no longer is aligned with the third antenna 103 but has slightly drifted out of alignment due to imperfections of the tracking algorithm. A system operator will thus manually have to move the BB 105 (as illustrated by the arrow) to a position in the image of FIG. 1b where the BB 105 again is aligned with the contours of the third antenna 103, which is both inefficient and undesirable.

Figure 2:
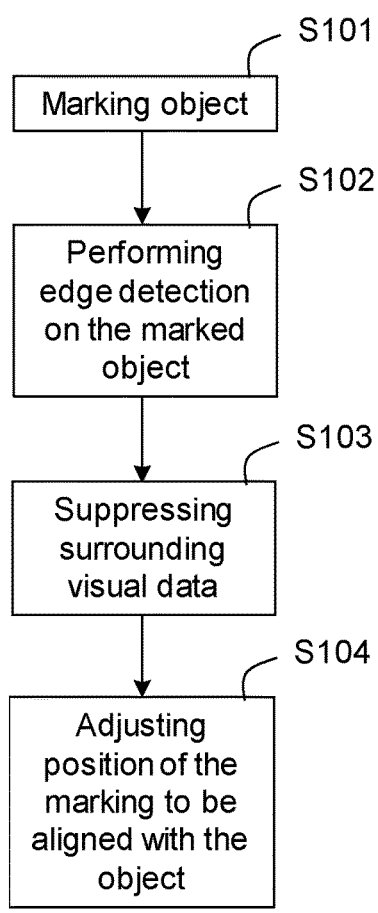
FIG. 2 illustrates a flowchart of a method of facilitating annotation of an object in a sequence of images according to an embodiment.

FIG. 2 illustrates a flowchart of a method of facilitating annotation of an object in a sequence of images according to an embodiment. The method may be performed by a processing unit of a computer such as a laptop or desktop forming a workplace of the system operator along with a screen on which the sequence of images can be displayed.

Figure 3:
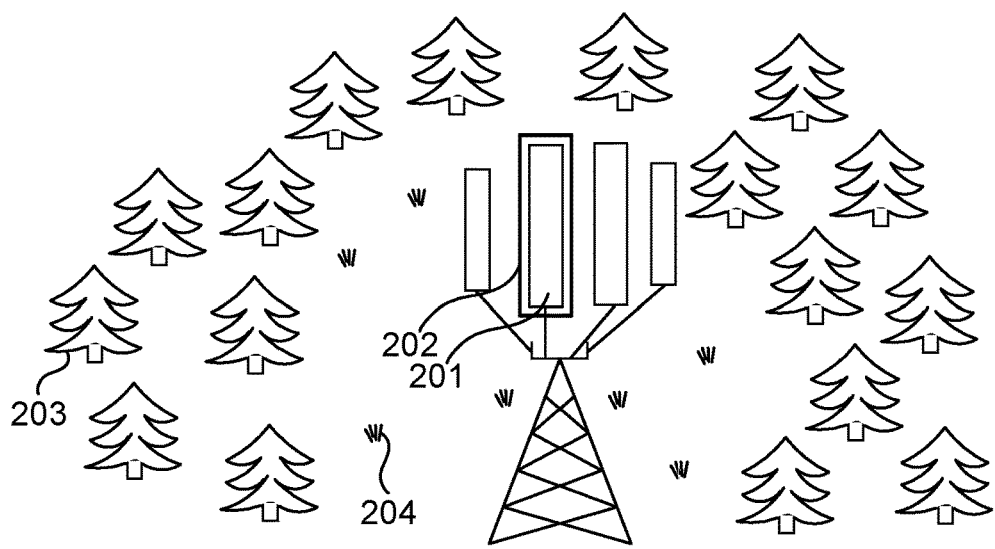
FIG. 3 illustrates a captured image of a cell tower before having been processed according to the method of FIG. 2.
Figure 4:
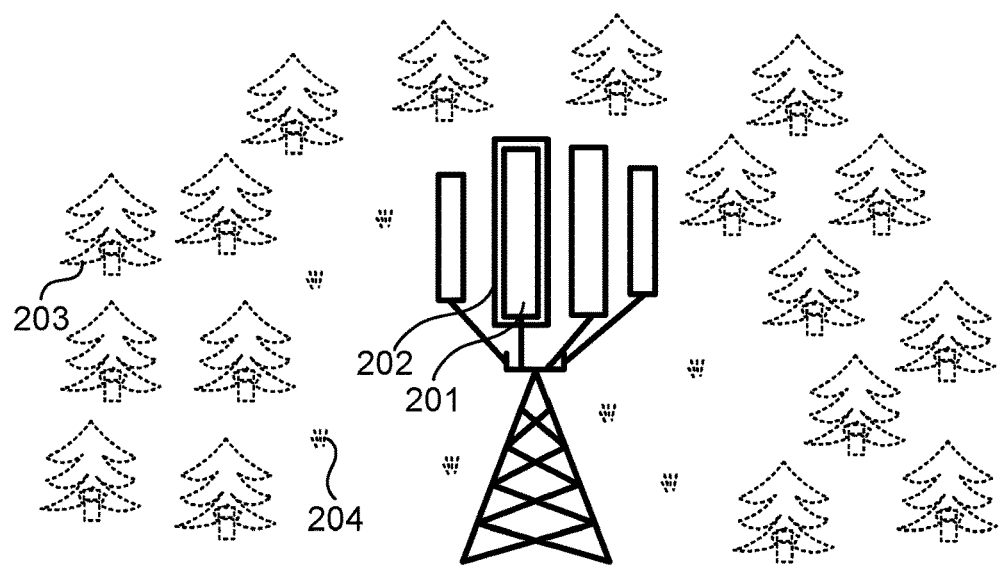
FIG. 4 illustrates a captured image of a cell tower having been subjected to edge detection according to the method of FIG. 2.
Figure 5:
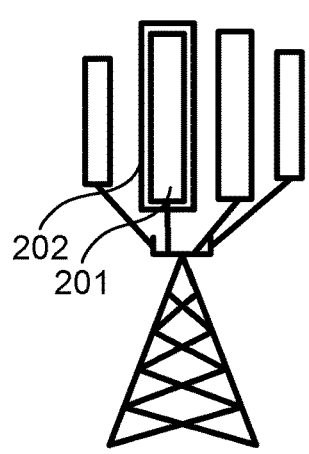
FIG. 5 illustrates a captured image of a cell tower having been subjected to visual data suppression according to the method of FIG. 2.

For illustrative purposes, reference will further be made to FIGS. 3-5 illustrating images being processed according to the method of FIG. 2. In a first step S101, an object of an image to be tracked in a sequence of images is marked. Hence, a system operator may manually place a marking around the object in a first of the images in the sequence, or a tracking algorithm may automatically place a marking around the object. This marking is embodied by a BB in the illustrated images.

As shown in FIG. 3, a section of a cell tower in the form of an antenna 201 may be marked by means of the operator placing a BB 202 in the image (or the tracking algorithm may automatically place the BB 202 in the image). The image in FIG. 3 is an RGB (red, green, blue) colour space image $I_{RGB}$.

Thereafter, as illustrated in FIG. 4, edge detection is performed on the marked antenna 201 in step S102 in order to visually enhance the antenna 201 with respect to surrounding visual data in the image, in this particular example background scenery surrounding the antenna, i.e. surrounding forest 203 and grassland 204. In other words, edge segmentation is performed on the antenna 201, resulting in an image $I_{SEG\_EDGE}$.

Further, with reference to FIG. 5, the surrounding visual data 203, 204 in the image is suppressed in step S103, thereby causing the marked object (i.e. the antenna 204) to be even further visually enhanced with respect to its surroundings. Hence, in FIG. 5, not only has edge segmentation been performed but also colour segmentation, resulting in an image $I_{SEG}$.

Advantageously, as can be concluded from FIG. 5, the marked antenna 201 has been heavily segmented with respect to its surroundings, and the ability of the tracking algorithm of moving the possibly drifting BB 202 to a position where it is aligned with the antenna 201 in one or more subsequent images of the sequence—as performed in step S104—is greatly improved since the marked antenna 201 is so clearly distinguishable from its surroundings after edge and colour segmentation has been applied to the sequence of images.

It is noted that even if a system operator manually would have to adjust the position of the BB 202 in one or more images in the sequence, visual inspection of the accuracy of the alignment of the BB 202 with the edges of the object is greatly facilitated in the edge- and colour-segmented image $I_{SEG}$ as compared to the original RGB image $I_{RGB}$.

Thus, the embodiment illustrated with the flowchart of FIG. 2 mitigates shortcomings of the previously described prior art annotation process in that visual enhancement of the marked object is attained by replacing the original image $I_{RGB}$ with the image $I_{SEG}$ with the background removed and only object edges highlighted. This helps the user to quickly identify if the BB 202 traces the contours of the object, i.e. in the exemplifying embodiment being antenna 201.

The embodiment advantageously reduces cost of visual data annotation and allows image and video analytics infrastructure to be built faster and cheaper; creating of training data creation is currently the limitation factor for these applications.

In an embodiment, the edge detection to which the object is being subjected in step S102 of FIG. 2 will be undertaken as described in the following with reference to the flowchart of FIG. 6.

In step S201, each originally captured image colour image $I_{RGB}$ in the sequence is converted to a grayscale image $I_{GRAY}$.

Thereafter, in step S202, any suitable edge detector is applied, for instance Canny edge detection, to each grayscale image $I_{GRAY}$ to obtain binary images $I_{EDGE}$.

Finally, a mask is created in step S203 for each image in the sequence representing the detected edges of the object. For instance, morphological dilation may be performed in step S203 on the binary images $I_{EDGE}$ with a disk-shaped structuring element S to obtain a mask $Y_{EDGE}$ (in the following referred to as edge mask) to be applied to the originally captured colours images $I_{RGB}$:

$$Y_{EDGE} = I_{EDGE} \oplus S \qquad \text{equation (1)}$$

Now, if the colour images $I_{RGB}$ in the sequence is masked with $Y_{EDGE}$, the result will be segmentation based on edges only, thereby producing images $I_{SEG\_EDGE}$ as shown in FIG. 4.

To use the images $I_{SEG\_EDGE}$ being subjected to edge detection only for visual inspection is possible but not preferred, if the method also can be complemented with colour segmentation. However, as will be described in the below, using edge segmentation only (and thus not colour segmentation) is a possible fallback for cases when colour segmentation cannot be used. The reason that use of only edge-segmentation is not preferred can be deduced from the illustration in FIG. 3, where the surrounding visual data (i.e. the grassland and forest scenery) generates a large number of edges.

Thus, in an embodiment, the suppression of surrounding visual data—i.e. in this example the grassland and forest scenery—as described in step S103 will be performed as set out in the following with reference to the flowchart of FIG. 7 utilizing colour segmentation. The colour segmentation is typically performed in parallel with the edge segmentation.

In step S301, each originally captured colour image $I_{RGB}$ in the sequence is optionally converted to a colour space less sensitive to illumination variations such as for instance CIELab, HSI ("hue, saturation, intensity"), and YUV (where Y denotes a luma component while U and V denotes chrominance components) colour spaces.

While the RGB colour space mixes colour and illumination, causing the RGB values to rapidly change if an object alternates between shadow and sun and thereby result in poor segmentation, this is not as evident in the CIELab, HIS or YUV colour spaces.

In the following, the conversion is exemplified to occur from RGB colour space images $I_{RGB}$ to CIELab colour space images $I_{LAB}$.

Thereafter in step S302, a colour value is acquired representing a colour distribution of the visual data to be suppressed from the sequence of images. In a scenario where no conversion is performed, the colour value is acquired from the original RGB images.

However, if the conversion is performed, the colour value is acquired in step S302 from the images to which conversion is made, in this example the CIELab images $I_{LAB}$. For instance, it may be envisaged that an average colour value of the visual data to be suppressed is acquired, i.e. an average colour value of the visual data surrounding the antenna 201 in the form of the forest 203 and the grassland 204. This colour value may be acquired from a current image in the sequence, or from one or more previously processed images in the sequence.

In this example, the average colour values of the CIELab images $I_{LAB}$ are denoted $\{\bar{L}, \bar{a}, \bar{b}\}$.

As is understood, if the colour value is acquired from surrounding visual data in the form of grassland, the acquired colour value would typically represent a greenish colour distribution, while if the colour value is acquired from surrounding visual data in the form of clear blue skies, the acquired colour value would typically represent a blueish colour distribution. It is noted that in an embodiment, it is envisaged that depth information is associated with each image in the sequence (for instance using a suitable camera with depth sensors, which depth information is evaluated to segment the object subjected to edge detection in each image of the sequence from the visual data to be suppressed. Thus, such embodiment would not only rely on colour distribution for the colour segmentation, but also the depth information of captured images.

The method of any one of the preceding claims, wherein depth information is associated with each image in the sequence, the method further comprising:

evaluating the depth information to segment the object subjected to edge detection in each image of the sequence from the visual data to be suppressed.

Thereafter, in step S303, a difference value $\Delta$ is computed indicating difference between colour values of the visual data to be suppressed in each image in the sequence and the acquired colour value representing colour distribution:

$$\Delta = \sqrt{(L - \bar{L})^2 + (a - \bar{a})^2 + (b - \bar{b})^2} \quad \text{equation (2)}$$

Finally, in step S304, a suppression threshold value Ts is used to create a binary mask $Y_{COLOR}$ for each image in the sequence where a binary mask pixel attains a first value if a corresponding computed difference value $\Delta$ exceeds the suppression threshold value Ts and a second value if the corresponding computed difference value is equal to or below the suppression threshold value Ts.

Thus, if the computed difference $\Delta$ between a colour value of the surroundings and the acquired average colour value is "small", i.e. the colour value of the surroundings is close to the average colour value, the computed difference $\Delta$ will be below the suppression threshold Ts and a corresponding pixel value of the binary mask $Y_{COLOR}$ is set to a first pixel value (e.g. "0"), and the corresponding pixel value of the image will be suppressed.

To the contrary, if the computed difference $\Delta$ between a colour value of the surroundings and the acquired average colour value is "great", i.e. the colour value is far from the average colour value, the computed difference $\Delta$ will exceed the suppression threshold Ts and a corresponding pixel value of the mask is set to a second pixel value (e.g. "1"), and the corresponding pixel value of the image will be visually enhanced instead of being suppressed.

Now, if the colour images $I_{RGB}$ in the sequence is masked with $Y_{COLOR}$, the result will be segmentation based on colours only, thereby producing colour-segmented images $I_{SEG\_COLOUR}$. However, a problem with only performing colour segmentation is that if the marked object—which is to be enhanced by means of edge detection—has sections being similar in colour to surrounding visual data, then there is a risk that such sections of the object is suppressed along with the (suppressed) surrounding data being close in colour. For instance, a blue object against a blue sky would more or less be suppressed and thus disappear from the image.

Figure 8:
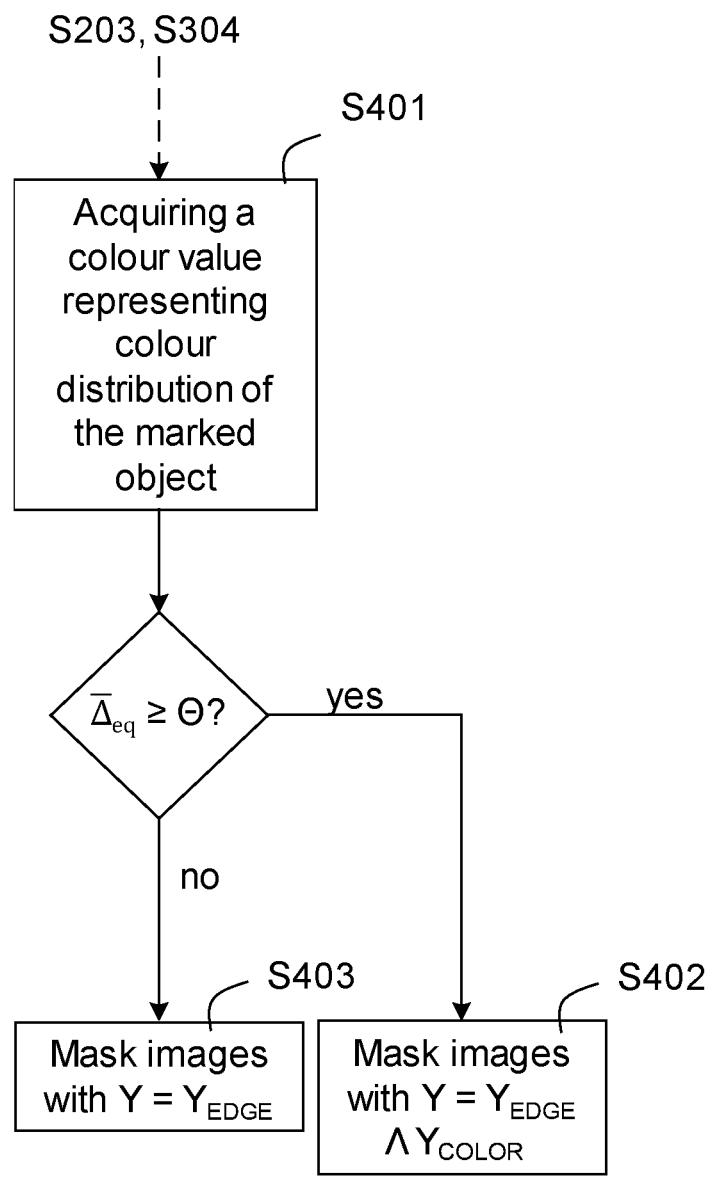
FIG. 8 illustrates a flowchart of a method of facilitating annotation of an object in a sequence of images according to still a further embodiment.

In an embodiment described with reference to the flowchart of FIG. 8, if a colour value of the marked antenna 201 as acquired in step S401 is sufficiently different from the surrounding visual data as determined by a set object distinction threshold $\theta$, then a combination of the two masks computed hereinabove is utilized to create a final mask $Y = Y_{EDGE} \wedge Y_{COLOR}$ according to step S402. If not, only the edge mask $Y_{EDGE}$ is utilized as set out in step S403.

The difference of the colour value of the antenna 201 and the colour value of the surrounding visual data in the form of forest 203 and grassland 204 may be computed as described previously with reference to equation (2) and is denoted $\Delta_{eq}$ for the marked antenna 201, where average colour values for the antenna 201 and the surrounding visual data 203, 204 may be used, respectively. Thus:

$$\text{IF} \quad \bar{\Delta}_{eq} \geq \Theta \quad \quad \text{equation (3)}$$
$$Y = Y_{EDGE} \wedge Y_{COLOR}$$
$$\text{ELSE} \quad Y = Y_{EDGE}$$

As is understood, with the combination of the two masks, both edge segmentation and colour segmentation are attained, as illustrated in FIG. 5. If only the edge mask is used, only edge segmentation is attained as illustrated in FIG. 4. It is noted that in a scenario where only the edge mask is used without considering colour segmentation, the method proceeds directly to step S403 from step S203. The usage of the edge mask $Y_{EDGE}$ only is advantageous for instance in a scenario where a blue object is portraited against a blue sky, as previously discussed. Thus, by introducing the object distinction threshold $\theta$, such problems may advantageously be resolved. In other words, the object distinction threshold $\theta$ is set to a predetermined threshold value for facilitating visual enhancing of the marked object with respect to the surrounding visual data, thus making the marked object more distinct.

In the above example, the average colour values are used. However, the colours could be modelled according to a multimodal distribution, for example GMM (Gaussian Mixture Model), with different colours for different parts.

Thereafter, the originally captured images $I_{RGB}$ in the sequence are masked with Y in steps S402 or S403 to visually enhance the antenna 201 by means of edge detection and to suppress the forest 203 and the grassland 204, which results in a desired image $I_{SEG}$ as illustrated in FIG. 5. Advantageously, with this image, aligning of the BB with the contours of the antenna 201 is greatly facilitated.

Figure 9:
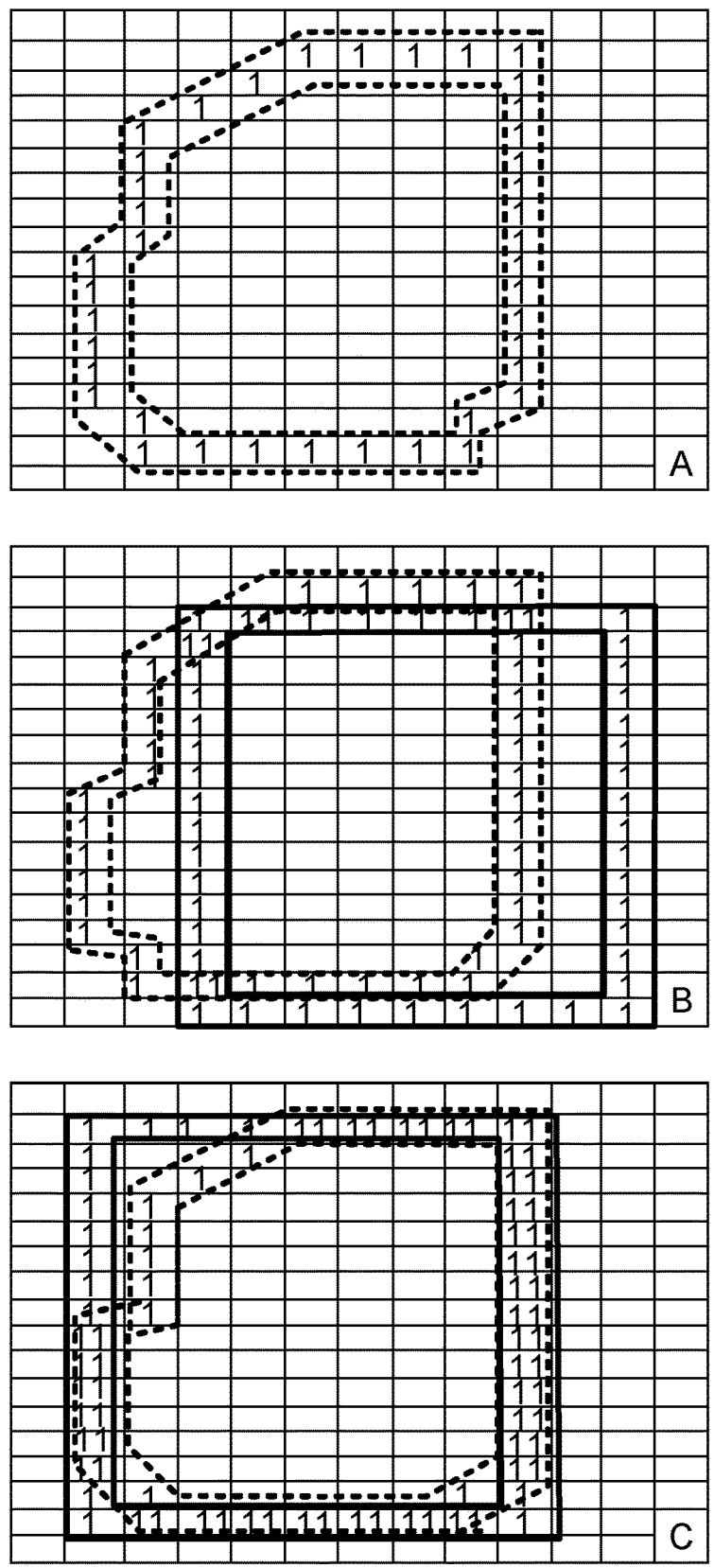
FIGS. 9a-c illustrates aligning of a marking to an object according to an embodiment.

FIG. 9a illustrates the created mask Y according to equation (3) which is used for edge and colour segmentation of the captured images $I_{RGB}$. As can be seen, only the edges of the marked object remain as indicated by corresponding pixel data of the mask being set to "1" while the remaining pixels are blank (or in practice set to "0") representing suppressed visual data. As a result, after a captured image $I_{RGB}$ is marked with Y, the resulting image $I_{SEG}$ will also have the appearance of the mask shown in FIG. 9a.

FIG. 9b illustrates the mask Y of FIG. 6a together with the BB, which in this example has drifted and is not aligned with the mask Y (and is thus not aligned with the object represented by the mask). Hence, the BB should be moved to a position where the BB indeed is aligned with the object to be marked in the masked image $I_{SEG}$. In FIG. 9b, the BB consists of the pixels enclosed by dashed lines while the mask Y consists of the pixels enclosed by continuous lines.

Thus, as illustrated in FIG. 9c, the BB is moved until it overlaps with the contours of the object as represented by the mask Y. In practice, the BB is moved in every direction, but by no more than X pixels where X can be considered to represent a search area around an initial BB position location. In the case of consecutive images in the sequence, X is a small number since the object does not move much from one image to another, unless a large instant movement of the camera is undertaken which may result in a greater number X.

At every position, an error may be computed defined as number of BB pixels that do not match edge pixels represented by the mask Y. This can be calculated by simple XOR operation as all entities are binary (BB pixels are always 1 s, but at the corresponding locations in Y, there can be 1 s or 0 s depending on the edge location).

The optimal position for the BB in terms of alignment with the mask Y is determined as the position where the defined above error is minimized. In other words, the position of the BB where there is a maximum overlap of 1 s with the object (and thus the mask Y).

Alternatively, a threshold value may be used to determined when a sufficient degree of alignment is reached; when the number of overlapping pixels exceeds such an alignment threshold, the BB is considered to be aligned with the object.

It is noted that when the objects to be annotated have irregular shapes or contours, alternatives to using BB annotation may be envisaged such as e.g. polygon annotation or semantic per-pixel segmentation.

If any of these alternative annotation approaches are utilized, it may be beneficial to modify the procedure of searching for maximum overlap between edge pixels of the BB and the object being subjected to edge detection as described with reference to FIGS. 9a-c to maximizing the overlap between pixels of image areas covered by the BB and the object being subjected to edge detection.

Figure 10:
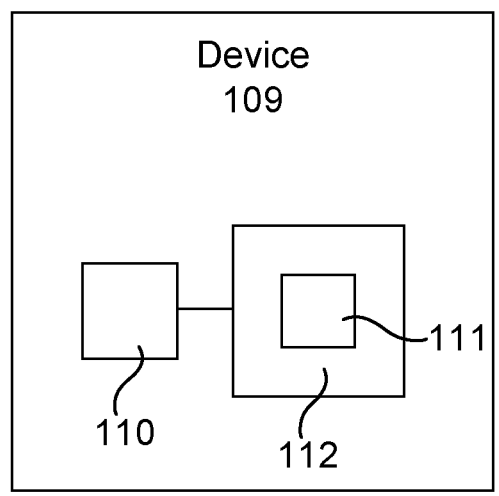
FIG. 10 illustrates a device configured to facilitate annotation of an object in a sequence of images according to an embodiment.

FIG. 10 illustrates a device 109 configured to facilitate annotation of an object in a sequence of images. The device 109 may be embodied in the form of the previously mentioned computer being for instance a laptop or desktop forming a workplace of the system operator along with a screen on which the sequence of images can be displayed, or a handheld device such as a tablet, a smart phone or any other appropriate terminal capable of performing annotation.

The steps of the method performed by the device 109 are in practice performed by a processing unit 110 embodied in the form of one or more microprocessors arranged to execute a computer program 111 downloaded to a suitable storage volatile medium 112 associated with the microprocessor, such as a Random Access Memory (RAM), or a non-volatile storage medium such as a Flash memory or a hard disk drive. The processing unit 110 is arranged to cause the device 109 to carry out the method according to embodiments when the appropriate computer program 111 comprising computer-executable instructions is downloaded to the storage medium 112 and executed by the processing unit 110. The storage medium 112 may also be a computer program product comprising the computer program 111. Alternatively, the computer program 111 may be transferred to the storage medium 112 by means of a suitable computer program product, such as a Digital Versatile Disc (DVD) or a memory stick. As a further alternative, the computer program 11 may be downloaded to the storage medium 112 over a network. The processing unit 110 may alternatively be embodied in the form of a digital signal processor (DSP), an application specific integrated circuit (ASIC), a field-programmable gate array (FPGA), a complex programmable logic device (CPLD), etc.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of facilitating annotation of an object in a sequence of images, the method comprising:
    marking the object in a first image in the sequence of images;
    performing an edge segmentation, wherein performing the edge segmentation comprises producing a first binary image by applying an edge detector to the first image or to a first version of the first image;
    using the first binary image to create a first edge mask;
    performing a color segmentation, wherein performing the color segmentation comprises:
        calculating a first color value using a first set of pixels from the first image or from a second version of the first image, wherein the first set of pixels correspond to the object;
        calculating a second color value using a second set of pixels from the first image or from the second version of the first image, wherein the second set of pixels correspond to visual data in the first image other than the object;
        creating a first color mask using the second color value; and
        determining that a difference between the first color value and the second color value satisfies a threshold condition;
    suppressing visual data other than the object, wherein suppressing visual data other than the object comprises masking the first image using both the first edge mask and the first color mask as a result of determining that the difference satisfies the threshold condition; and aligning a marking with the object in a second image of the sequence, wherein the second image follows the first image in the sequence, wherein the color segmentation is performed in parallel with the edge segmentation, and the marked object in the second image is more distinguishable from its surroundings after the color segmentation and the edge segmentation is performed.

2. The method of claim 1, wherein the method further comprises generating a grey scale version of the first image, and producing the binary image by applying the edge detector to the grey scale version of the first image.

3. The method of claim 1, the marking of the object in the first image comprises:

tracing contours of the object in the first image.

4. The method of claim 1, wherein the method further comprises:

producing a second binary image by applying the edge detector to the second image or to a version of the second image;

using the second binary image to create a second edge mask;

creating a second color mask;

masking the second image using both the second edge mask and the second color mask; and aligning a marking with the object in a third image of the sequence, wherein the third image follows the second image in the sequence.

5. A device configured to facilitate annotation of an object in a sequence of images, the device comprising a processing unit and a memory, the memory containing instructions executable by the processing unit, wherein the device is operative to perform a method comprising:

marking the object in a first image in the sequence of images;

performing an edge segmentation, wherein performing the edge segmentation comprises producing a first binary image by applying an edge detector to the first image or to a first version of the first image;

using the first binary image to create a first edge mask;

performing a color segmentation, wherein performing the color segmentation comprises:

calculating a first color value using a first set of pixels from the first image or from a second version of the first image, wherein the first set of pixels correspond to the object;

calculating a second color value using a second set of pixels from the first image or from the second version of the first image, wherein the second set of pixels correspond to visual data in the first image other than the object;

creating a first color mask using the second color value; and determining that a difference between the first color value and the second color value satisfies a threshold condition;

suppressing visual data other than the object, wherein suppressing visual data other than the object comprises masking the first image using both the first edge mask and the first color mask as a result of determining that the difference satisfies the threshold condition; and aligning a marking with the object in a second image of the sequence, wherein the second image follows the first image in the sequence, wherein the color segmentation is performed in parallel with the edge segmentation, and the marked object in the second image is more distinguishable from its surroundings after the color segmentation and the edge segmentation is performed.

6. The device of claim 5, wherein the method further comprises generating a grey scale version of the first image, and producing the binary image by applying the edge detector to the grey scale version of the first image.

7. The device of claim 5, wherein the marking of the object in the first image comprises tracing contours of the object in the first image.

8. The device of claim 5, wherein the method further comprises:

producing a second binary image by applying the edge detector to the second image or to a version of the second image;

using the second binary image to create a second edge mask;

creating a second color mask;

masking the second image using both the second edge mask and the second color mask; and aligning a marking with the object in a third image of the sequence, wherein the third image follows the second image in the sequence.

* * * * *